(12) United States Patent
Yoshida et al.

(10) Patent No.: US 7,538,846 B2
(45) Date of Patent: May 26, 2009

(54) LIQUID CRYSTAL DISPLAY DEVICE AND METHOD OF MANUFACTURING THE SAME

(75) Inventors: Hidefumi Yoshida, Kawasaki (JP); Yasutoshi Tasaka, Kawasaki (JP); Hideaki Tsuda, Kawasaki (JP); Yohei Nakanishi, Nara (JP); Tsuyoshi Kamada, Kawasaki (JP); Kazuya Ueda, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 11/374,415

(22) Filed: Mar. 14, 2006
(Under 37 CFR 1.47)

(65) Prior Publication Data
US 2007/0035685 A1 Feb. 15, 2007

(30) Foreign Application Priority Data
Mar. 16, 2005 (JP) .............................. 2005-075461

(51) Int. Cl.
*G02F 1/1343* (2006.01)

(52) U.S. Cl. ...................................... 349/147; 349/144
(58) Field of Classification Search ................. 349/144, 349/147
See application file for complete search history.

(56) References Cited

U.S. PATENT DOCUMENTS 6,078,367 A * 6/2000 Satou .......................... 349/46
2004/0150777 A1* 8/2004 Koike .......................... 349/139

FOREIGN PATENT DOCUMENTS

JP 2000-147554 5/2000

* cited by examiner

*Primary Examiner*—Michael H Caley
(74) *Attorney, Agent, or Firm*—Nixon & Vanderhye P.C.

(57) ABSTRACT

Sub picture element electrodes made of ITO are formed in a picture element region which is sectioned by gate bus lines and data bus lines. These sub picture element electrodes are electrically connected to each other with a wiring connection. This wiring connection includes a metal connection portion which is formed simultaneously with the data bus lines and the like, and an ITO connection portion which is formed simultaneously with the sub picture element electrodes.

10 Claims, 7 Drawing Sheets

LIQUID CRYSTAL DISPLAY DEVICE AND METHOD OF MANUFACTURING THE SAME

CROSS-REFERENCE TO RELATED APPLICATIONS

This application is based on and claims priority of Japanese Patent Application No. 2005-075461 filed on Mar. 16, 2005, the entire contents of which are incorporated herein by reference.

BACKGROUND OF THE INVENTION

1. Field of the Invention

The present invention relates to a liquid crystal display device and methods of manufacturing the same in which a plurality of sub picture element electrodes are formed, which are made of a transparent conductive material such as indium tin oxide (ITO) and the like, the sub picture element electrodes are electrically connected to each other with connection wiring of narrow width.

2. Description of the Prior Art

Liquid crystal display devices have the advantages that they are thin and light and that they can be operative at low voltages and have low power consumption. Accordingly, liquid crystal display devices are widely used in various kinds of electronic devices. In particular, active matrix liquid crystal display devices in which a thin film transistor (TFT) is provided as a switching element for each picture element show excellent display quality which is comparable to that of cathode-ray tube (CRT) displays, and therefore have come to be widely used for displays for televisions, personal computers (PCs), and the like.

In general, a liquid crystal display device has a structure in which liquid crystals are sealed between two substrates, the substrates being disposed to face each other. On one substrate, a TFT, a picture element electrode, and the like are formed, while color filters, a common electrode, and the like are formed on the other substrate. Hereinafter, a substrate on which a TFT, a picture element electrode, and the like are formed is referred to as a TFT substrate; and a substrate, which is disposed to face the TFT substrate, is referred to as an opposite substrate. A structure formed by sealing liquid crystals between the TFT substrate and the opposite substrate is referred to as a liquid crystal panel.

Figure 1:
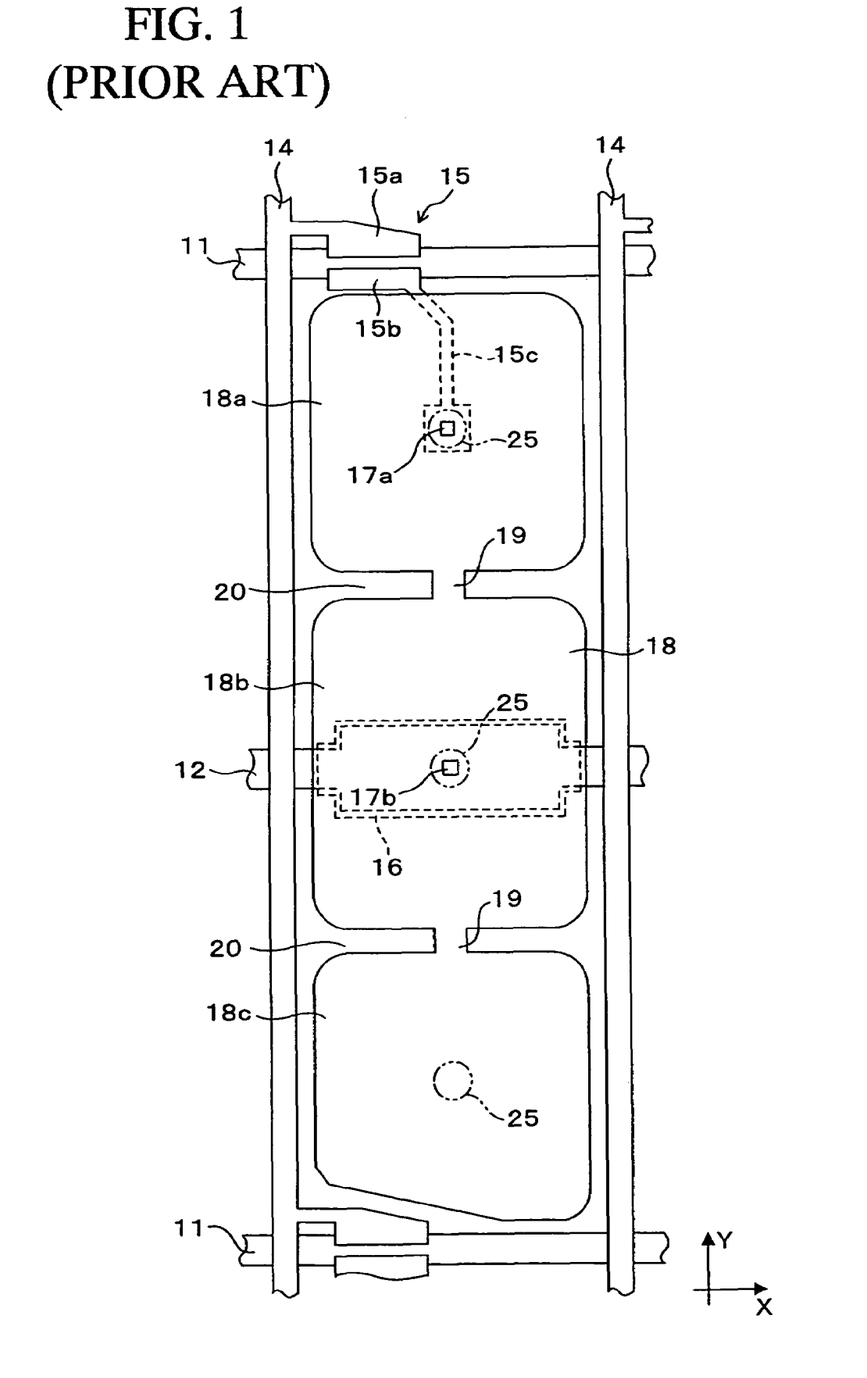
FIG. 1 is a plan view showing one example of a conventional liquid crystal display device.

FIG. 1 is a plan view showing one example of the conventional liquid crystal display device. FIG. 1 also shows a region for one picture element of a TFT substrate. Numeral 25 in FIG. 1 shows protrusions for alignment control provided on an opposite substrate.

As shown in FIG. 1, on the TFT substrate, a plurality of gate bus lines 11 extending in the horizontal direction (in the direction of X-axis) and a plurality of data bus lines 14 extending in the vertical direction (in the direction of Y-axis) are formed. Rectangular regions, which are sectioned by the gate bus lines 11 and the data bus lines 14, are picture elements regions, respectively.

On the TFT substrate, an auxiliary capacitance bus line 12 is placed in parallel with the gate bus lines 11, and formed across the center of a picture element region. The gate bus lines 11 and the auxiliary capacitance bus line 12 are covered with a first insulating film (gate insulating film), and the data bus lines 14 are formed on the first insulating film.

Furthermore, on the TFT substrate, a TFT 15, an auxiliary capacitance electrode 16, and a picture element electrode 18 are formed for each picture element region. In a liquid crystal display device shown in FIG. 1, the picture element electrode 18 is subdivided with slits 20 into three sub picture element electrodes 18a to 18c each being almost rectangular, and the sub picture element electrodes 18a to 18c are electrically connected to each other with connection wiring 19.

For the TFT 15, part of the gate bus lines 11 serves as a gate electrode, and a semiconductor film (not shown) formed on a predetermined region of the first insulating film serves as an active layer. A drain electrode 15a and a source electrode 15b of the TFT 15 are placed to face each other with a gate bus line 11 interposed therebetween, and are respectively connected to the semiconductor film. The drain electrode 15a is connected to the data bus lines 14, and the source electrode 15b is electrically connected to the sub picture element electrode 18a through a line 15c, as described later.

The auxiliary capacitance electrode 16 is placed to face the auxiliary capacitance bus line 12 with the first insulating film interposed therebetween. An auxiliary capacitance includes the auxiliary capacitance electrode 16, the auxiliary capacitance bus line 12, and the first insulating film interposed therebetween.

A second insulating film is formed on the gate bus lines 14, the TFT 15, and the auxiliary capacitance electrode 16; and, on this second insulating film, the three sub picture element electrodes 18a to 18c as described above are placed side by side in the direction of Y-axis. These sub picture element electrodes 18a to 18c are formed using a transparent conductive material such as indium tin oxide (ITO), and are electrically connected to each other with the connection wiring 19 made of a transparent conductive material of the same kind as above. The sub picture element electrode 18a is electrically connected to wiring 15c extending from the source electrode 15b through a contact hole 17a formed on the second insulating film. The sub picture element electrode 18b is electrically connected to the auxiliary capacitance electrode 16 through a contact hole 17b formed on the second insulating film.

On the opposite substrate, a common electrode, a color filter, and protrusions 25 for alignment control are provided. The common electrode is formed using a transparent conductive material such as ITO, and placed to face the sub picture element electrodes 18a to 18c on the TFT substrate. Color filters of three different colors, red (R), green (G), and blue (B), are prepared. A color filter of any one color among red, green, and blue is placed in each picture element. The protrusions 25 for alignment control are formed almost in cone using a dielectric material such as resin, and placed at positions facing to almost the centers of the sub picture element electrodes 18a to 18c.

The TFT substrate and the opposite substrate are placed with spacers (not shown) interposed therebetween, and liquid crystals with negative dielectric anisotropy are sealed between these TFT and opposite substrates whereby a liquid crystal panel is formed. On both sides of the liquid crystal panel, polarizing plates are respectively disposed, and, further, a backlight is disposed on the backside (the opposite side of a face for observation) of the liquid crystal panel whereby a liquid crystal display device is constituted.

In the liquid crystal display device constituted in the above described way, the gate bus lines 11 are provided with scanning signals which cause the TFT 15 to be performed in on/off operation, and the data bus lines 14 are provided with display signals. When a voltage is not applied on a layer of liquid crystals, liquid crystal molecules are aligned almost perpendicular to the substrate surfaces. However, liquid crystal molecules in the vicinities of the protrusions 25 are aligned in directions perpendicular to the inclined surfaces of the protrusions 25. In this state, since light emitted from the backlight is blocked by two polarizing plates, a black display is presented.

When the scanning signals provided to the gate bus lines 11 cause the TFT 15 to be turned on, the sub picture element electrodes 18a to 18c are provided with the display signals, and liquid crystal molecules are inclined at angles in accordance with the voltages of the display signals. In this case, directions in which the liquid crystal molecules fall are determined by the protrusions 25 for alignment control and the lines of electric forces generated in oblique directions from edges of the sub picture element electrodes 18a to 18c to the outside; and the liquid crystal molecules are aligned in radial direction with respect to the protrusions 25 as centers. In this state, of the light emitted from the backlight, certain amount of light in accordance with inclined angles of the liquid crystal molecules is transmitted through the two polarizing plates, and emitted to the front side (observer side).

When the alignment directions of liquid crystal molecules in one picture element are uniform, display quality when viewed from an oblique direction is significantly deteriorated compared with that when viewed from the front. However, in the liquid crystal display device shown in FIG. 1, since the liquid crystal molecules as described above are aligned in radial direction with respect to the protrusions 25 as centers, the liquid crystal display device has the advantages that the display quality when viewed from an oblique direction is improved, and favorable viewing angle characteristics can be achieved.

Figure 2:
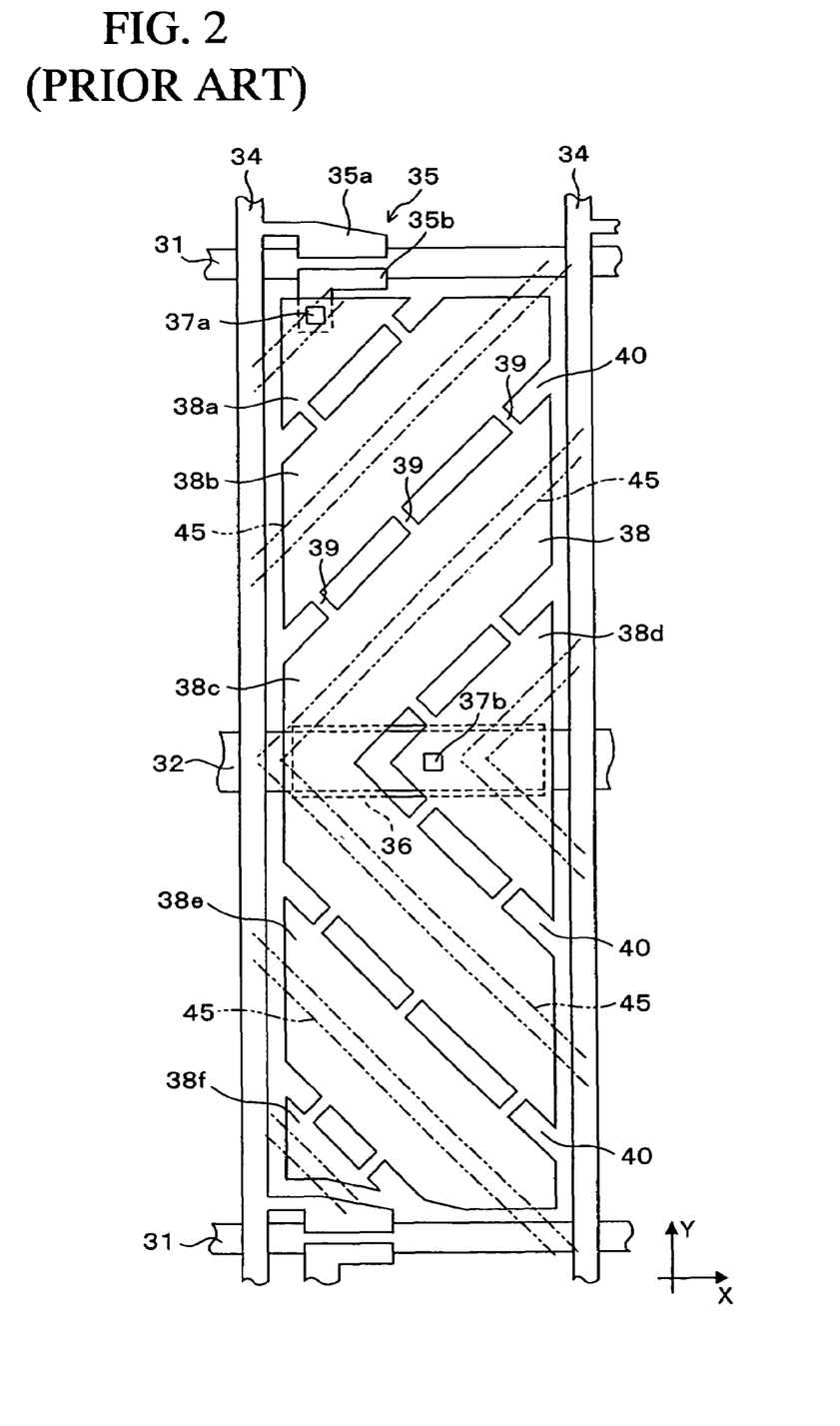
FIG. 2 is a plan view showing another example of a conventional liquid crystal display device.

FIG. 2 is a plan view showing another example of a conventional liquid crystal display device. FIG. 2 also shows a region for one picture element of a TFT substrate. Numerals 45 in FIG. 2 show protrusions for alignment control provided on an opposite substrate.

In this liquid crystal display device as in the foregoing described one, on the TFT substrate, gate bus lines 31 extending in the horizontal direction (in the direction of X-axis), data bus lines 34 extending in the vertical direction (in the direction of Y-axis), and an auxiliary capacitance bus line 32 which is placed in parallel with the gate bus lines 31 and which intersects a picture element region, are formed. The gate bus lines 31 and the auxiliary capacitance bus line 32 are covered with a first insulating film (gate insulating film), and the data bus lines 34 are formed on the first insulating film.

For each picture element region, the TFT 35, the auxiliary capacitance electrode 36, and a picture element electrode 38 are formed. For the TFT 35, part of the gate bus lines 31 serves as a gate electrode; and a drain electrode 35a and a source electrode 35b are placed to face each other with a semiconductor film (not shown) the film being placed over the gate electrode and interposed between the drain and source electrodes 35a, 35b.

The auxiliary capacitance electrode 36 is formed to face an auxiliary capacitance bus line 32 with the first insulating film interposed therebetween. An auxiliary capacitance includes the auxiliary capacitance electrode 36, the auxiliary capacitance bus line 32, and the first insulating film interposed therebetween.

A second insulating film is formed on the gate bus lines 34, the TFT 35, and the auxiliary capacitance electrode 36; and, on this second insulating film, a picture element electrode 38 is formed using a transparent conductive material such as ITO. The picture element electrode 38 is subdivided into six sub picture element electrodes 38a to 38f using a plurality of slits 40 which are symmetrically formed on the upper and lower sides of the auxiliary capacitance bus line 32 with respect to the centerline thereof as the line of symmetry and which extend into oblique directions. However, the sub picture element electrodes 38a to 38f are electrically connected to each other with connection wiring 39 made of a transparent conductive material such as ITO. The sub picture element electrode 38a is connected to the source electrode 35b of the TFT 35 through a contact hole 37a formed on the second insulating film. The sub picture element electrode 38d is electrically connected to the auxiliary capacitance electrode 36 through a contact hole 37b formed on the second insulating film.

On the opposite substrate, a common electrode, a color filter, and protrusions 45 for alignment control are provided. The common electrode is formed using a transparent conductive material such as ITO, and placed to face the sub picture element electrodes 38a to 38f on the TFT substrate. Color filters of three different colors, red (R), green (G), and blue (B), are prepared. A color filter of any one color among red, green, and blue is placed in each picture element. The protrusions 45 for alignment control are made of a dielectric material such as resin, and placed in regions between the slits 40 of the picture element electrode 38 in parallel therewith.

The TFT substrate and the opposite substrate are placed with spacers (not shown) interposed therebetween, and liquid crystals with negative dielectric anisotropy are sealed between these TFT and opposite substrates whereby a liquid crystal panel is formed. On both sides of the liquid crystal panel, polarizing plates are respectively disposed, and, further, a backlight is disposed on the back of the liquid crystal panel whereby a liquid crystal display device is constituted.

In the liquid crystal display device constituted in the above described way, when a voltage is not applied on a layer of liquid crystals, liquid crystal molecules are aligned almost perpendicular to the substrate surfaces. However, liquid crystal molecules in the vicinities of the protrusions 45 are aligned in directions perpendicular to the inclined surfaces of the protrusions 45. In this state, since light emitted from the backlight is blocked by two polarizing plates, a black display is presented.

When the scanning signals provided to the gate bus lines 31 cause the TFT 35 to be turned on, the sub picture element electrodes 38a to 38f are provided with the display signals, and liquid crystal molecules are inclined at angles in accordance with the display signals. In this case, directions in which the liquid crystal molecules fall are determined by the protrusions 45 and the slits 40, and the liquid crystal molecules are aligned in directions perpendicular to the protrusions 45 and the slits 40. That is, in this liquid crystal device, a plurality of regions (domain) are formed, in which directions where the liquid crystal molecules fall are different while setting the protrusions 45 and the slits 40 as boundaries. In this state, of the light emitted from the backlight, certain amount of light in accordance with inclined angles of the liquid crystal molecules is transmitted through the two polarizing plates, and emitted to the front side (observer side).

In the liquid crystal display device shown in FIG. 2, in one picture element, a plurality of regions in which directions where the liquid crystal molecules fall are different are formed, and thus favorable viewing angle characteristics can be achieved.

However, both liquid crystal display devices as described above have the following problems. In the liquid crystal display device shown in FIG. 1, the sub picture element electrode 18a and the sub picture element electrode 18b; and the sub picture element electrode 18b and the sub picture element electrode 18c are connected with the connection wiring 19 which is made of a transparent conductive material such as ITO and which is small in width. Accordingly, once the connection wiring 19 breaks, a voltage is not transmitted to other sub picture element electrodes, hence coming to defective. It is considered to make the connection wiring 19 wider to avoid break. However, in that case, turbulence in alignment of liquid crystal molecules will occur in the connection wiring 19, hence causing deterioration in display quality.

In the liquid crystal display device shown in FIG. 2, since the sub picture element electrodes 38a to 38f are respectively connected through a plurality of connection wirings 39, only one break in the connection wiring 39 does not cause defect. However, since a transparent conductive material such as ITO has a relatively high resistance, when one of the wirings 39 even breaks, a voltage being applied on liquid crystals partly decreases, hence causing deterioration in display quality.

SUMMARY OF THE INVENTION

In light of the above, an object of the present invention is to provide a liquid crystal display device and a method of manufacturing the same in which a favorable display quality can be maintained when a break occurs even in a transparent conductive material connecting sub picture element electrodes.

The above described problem can be solved by a liquid crystal display device which has a first substrate and a second substrate the first and second substrates being placed to face each other, and a layer of liquid crystals being formed by sealing liquid crystals between the first and second substrates; and in which a plurality of sub picture element electrodes made of a transparent conductive material is formed on the first substrate in each picture element region, the liquid crystal display device including a connection wiring which has a metal connection portion made of a metal film, and a transparent conductive connection portion made of a transparent conductive material the transparent conductive connection portion being formed on the metal connection portion; and with which the plurality of sub picture element electrodes in one picture element region are electrically connected to each other.

In the present invention, the connection wiring connecting the sub picture element electrodes to each other is formed by the metal connection portion made of a metal film and the transparent conductive connection portion made of a transparent conductive material. Hence, when a break occurs even in a transparent conductive connection portion in a manufacturing process, the establishing of electrical connections between the respective sub picture element electrodes can be secured.

The above described problems can be solved by a method of manufacturing a liquid crystal display device, including the steps of forming a first metal film on a first substrate; forming a gate bus line by patterning the first metal film; forming a first insulating film on the entire upper face of the first substrate; forming a semiconductor film, which becomes an active layer for a thin-film transistor, on a predetermined region of the first insulating film; forming a second metal film on the entire upper face of the first substrate; forming a data bus line, a source electrode and a drain electrode constituting the thin-film transistor, and a metal connection portion by patterning the second metal film; forming a second insulating film on the entire upper face of the first substrate; forming in the second insulating film an opening into which the metal connection portion is exposed; forming a transparent conductive film on the entire upper face of the first substrate; forming a plurality of sub picture element electrodes in an each picture element region and forming a transparent conductive connection portion which is connected to the metal connection portion being exposed into the opening and with which the plurality of sub picture element electrodes are electrically connected by patterning the transparent conductive film; and placing a second substrate to face the first substrate, and sealing liquid crystals therebetween.

In the present invention, the metal connection portion is formed simultaneously with the data bus lines and the like, and the transparent conductive connection portion is formed simultaneously with the sub picture element electrodes; and thus the sub picture element electrodes are electrically connected with a connection wiring which is formed by the metal connection portion and the transparent conductive connection portion. Hence, when a break occurs even in a transparent conductive connection portion in a manufacturing process, the establishing of electrical connections between the respective sub picture element electrodes can be secured, thus avoiding an increase in manufacturing steps.

Japanese Patent Application Laid-open No. 2000-147554 describes a laminated structure of a metal film (gate wiring) and an ITO film. However, in the technology described in the above document, the laminated structure of a metal film and an ITO film is used to increase a capacitance value of an auxiliary capacitance in a gate storage type liquid crystal display device. Accordingly, the laminated structure of a metal film and an ITO film described in the above document does not have an effect in which the establishing of electrical connections between the sub picture element electrodes is secured.

DESCRIPTION OF THE PREFERRED EMBODIMENTS

Embodiments of the present invention will, hereinafter, be described with reference to the accompanying drawings.

First Embodiment

Figure 3:
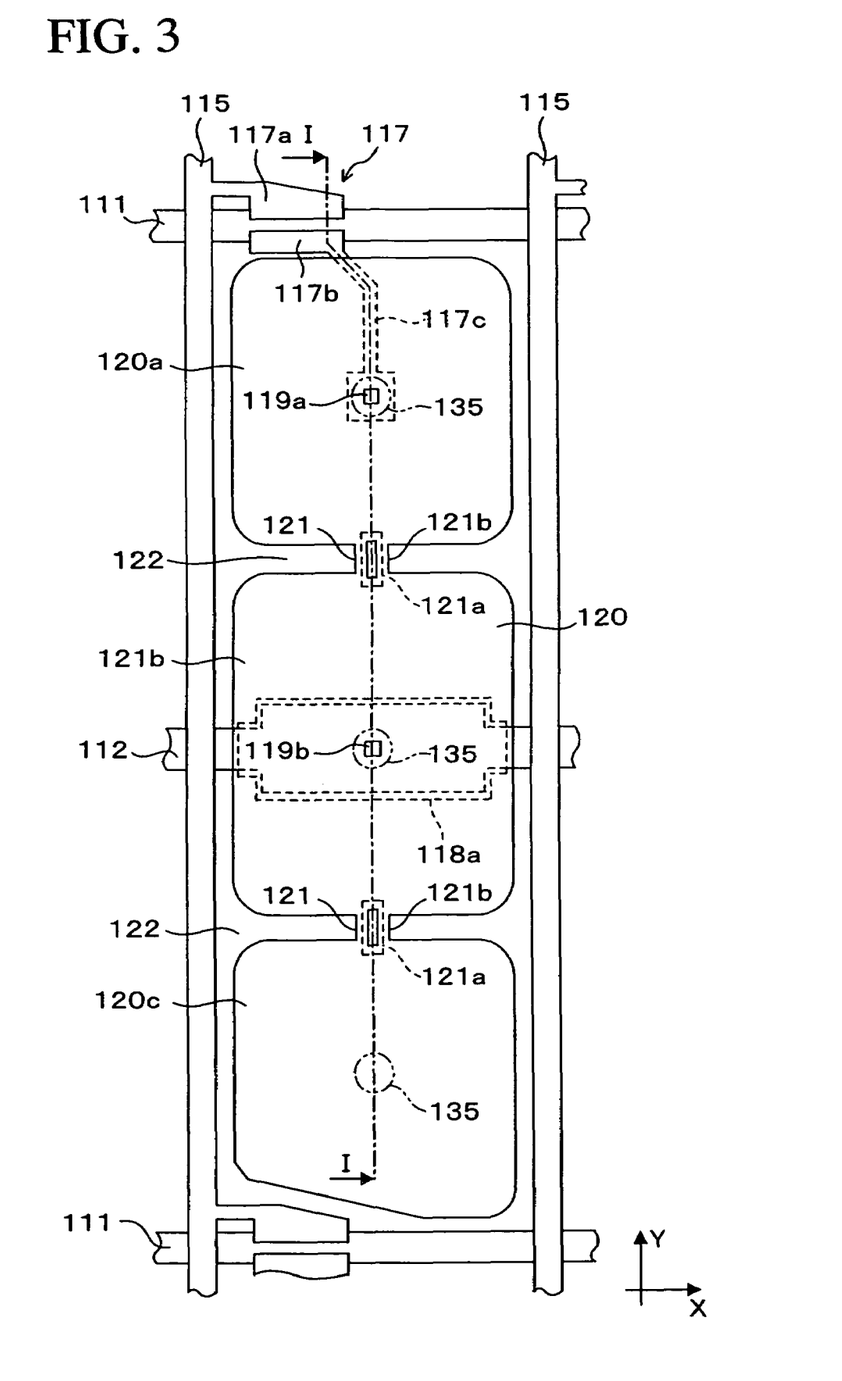
FIG. 3 is a plan view showing a liquid crystal display device of a first embodiment of the present invention.
Figure 4:
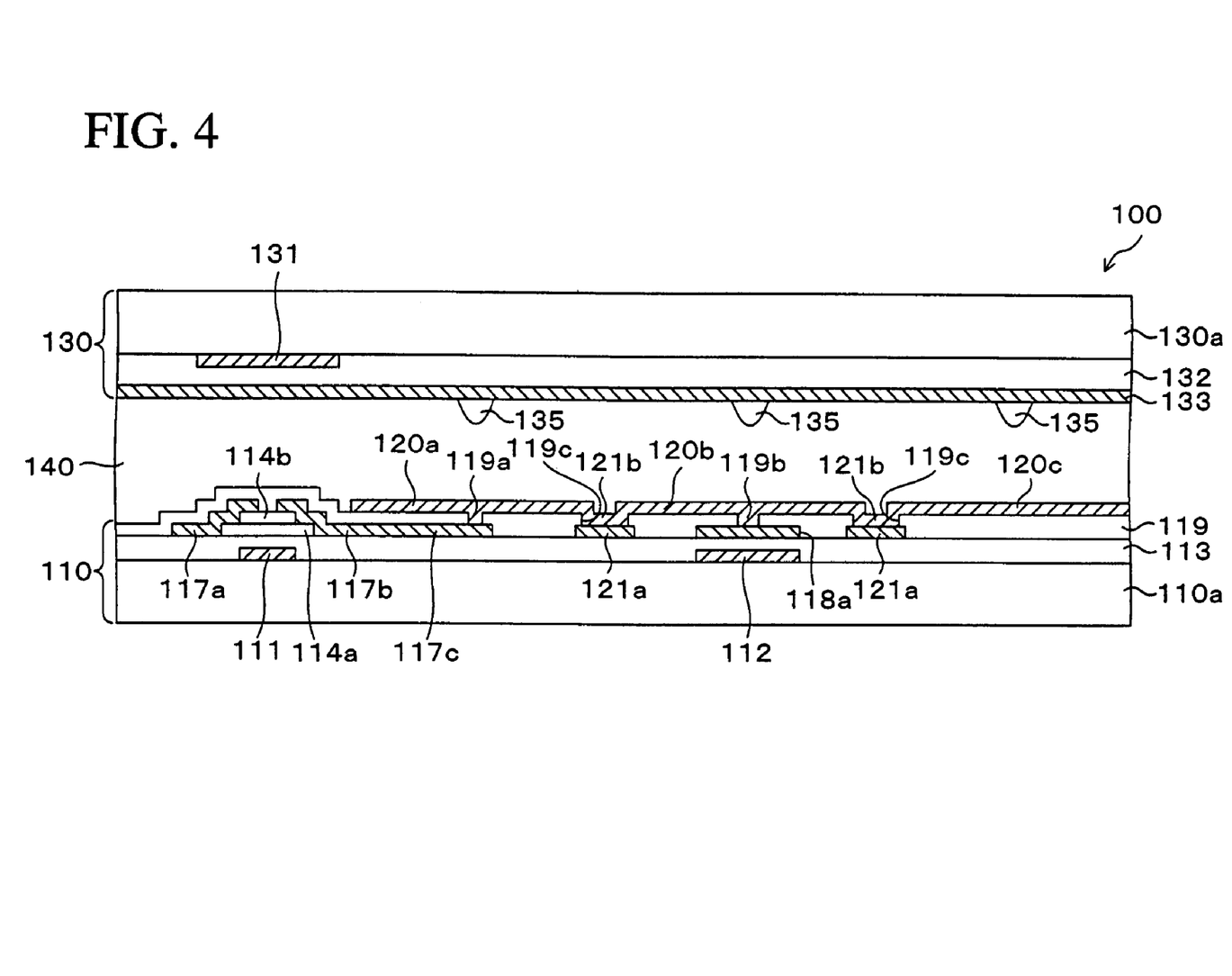
FIG. 4 is a sectional view taken along the line I-I in FIG. 3.

FIG. 3 is a plan view showing a liquid crystal display of a first embodiment of the present invention, and FIG. 4 is a sectional view taken along the line I-I in FIG. 3.

As shown in FIG. 4, a liquid crystal panel 100 includes a TFT substrate 110, an opposite substrate 130, and a layer of liquid crystals 140 formed by liquid crystals with negative dielectric anisotropy which are sealed between the TFT substrate 110 and the opposite substrate 130. Polarizing plates are placed on the front side (observer side; the upper side in FIG. 4) of the liquid crystal panel 100 and on the back side (the lower side in FIG. 4) thereof, and further a backlight (not shown) is placed on the back side.

As shown in FIG. 3, on the TFT substrate 110, a plurality of gate bus lines 111 extending in the horizontal direction (in the direction of X-axis), and a plurality of data bus liens 115 extending in the vertical direction (in the direction of Y-axis) are formed. Rectangular regions, which are sectioned by these gate bus lines 111 and data bus lines 115, are picture element regions, respectively. Furthermore, on the TFT substrate 110, an auxiliary capacitance bus line 112 which is placed in parallel with the gate bus lines 111 and which intersects the center of a picture element region is formed.

In addition, on the TFT substrate 110, a TFT 117, an auxiliary capacitance electrode 118a and a picture element electrode 120 are formed for each picture element region. In the present embodiment, the picture element electrode 120 is subdivided with slits 122 into three sub picture element electrodes 120a to 120c of almost quadrate, approximately 80 μm square. The sub picture element electrodes 120a to 120c are formed of a transparent conductive material such as ITO, and electrically connected to each other with connection wirings 121. Each of the connection wirings 121 has a laminated structure which is formed by a metal connection portion 121a made of metal and an ITO connection portion (transparent conductive connection portion) made of ITO, as described later.

For the TFT 117, part of the gate bus lines 111 serves as a gate electrode. Over this gate electrode, a semiconductor film 114a, which becomes an active layer for the TFT 117, is formed, and a drain electrode 117a and a source electrode 117b are placed to face each other on both sides of the semiconductor film 114a in the direction of Y-axis. The drain electrode 117a is connected to a data bus line 115, and the source electrode 117b is electrically connected to the sub picture element electrode 120a through a wiring 117c.

The auxiliary capacitance electrode 118a is placed to face the auxiliary capacitance bus line 112 with a first insulating film 113 interposed therebetween. This auxiliary capacitance electrode 118a, the auxiliary capacitance bus line 112, and the first insulting film 113 interposed therebetween form an auxiliary capacitance.

A second insulating film (an interlayer insulation film) 119 is formed on the data bus line 115, the TFT 117, and the auxiliary capacitance electrode 118a; and, on this second insulating film 119, the aforementioned three sub picture element electrodes 120a to 120c are formed side by side in the direction of Y-axis. The sub picture element electrode 120a is electrically connected to the wiring 117c extending from the source electrode 117b through a contact holes 119a formed in the second insulating film 119. The sub picture element electrode 120b is electrically connected to the auxiliary capacitance electrode 118a through a contact hole 119b formed in the second insulating film 119.

On the opposite substrate 130, a black matrix (light blocking film) 131, a color filter 132, a common electrode 133, and protrusions 135 for alignment control structures are formed. The black matrix 131 is formed using metal such as Cr (chromium), or black resin and placed at a position where the black matrix 131 faces the gate bus lines 111, the data bus lines 115, and the TFT 117 on the TFT substrate 110. For the color filter 132, color filters of three different colors, i.e. red (R), green (G), and blue (B), are prepared, and a color filter of any one color among red, green, and blue is placed in each picture element. The common electrode 133 is made of a transparent conductive material such as ITO, and formed on (in FIG. 4, beneath) the color filter 132. The protrusions 135 for alignment control are formed almost in cone using a dielectric material such resin, and placed at positions facing to almost the centers of the sub picture element electrodes 120a to 120c.

Figure 5:
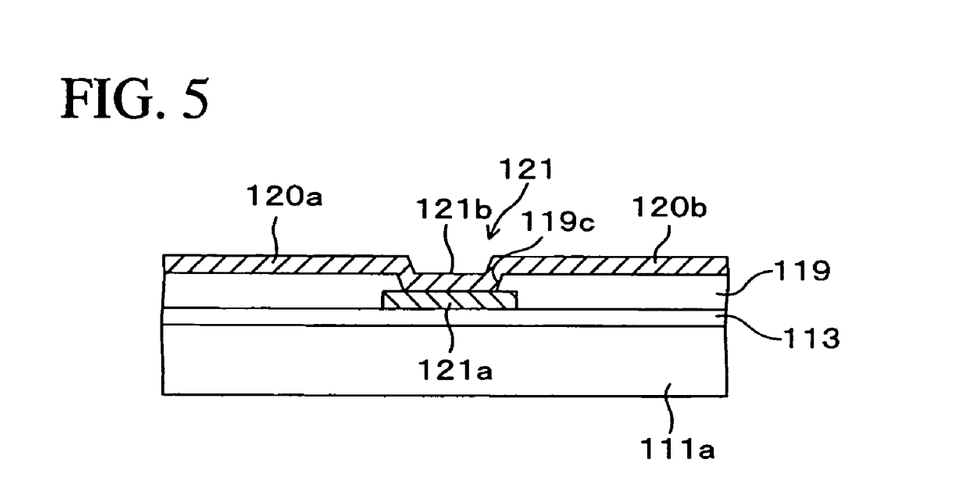
FIG. 5 is an enlarged sectional view for a connection wiring.

FIG. 5 is an enlarged sectional view for the connection wirings 121. As shown in FIG. 5, the connection wiring 121 is constituted by the metal connection portion 121a made of metal, and the ITO connection portion 121b formed integral with the sub picture element electrodes 120a to 120c. The metal connection portion 121a is formed on the first insulating film 113; and the ITO connection portions 121b is formed on the second insulating film 119 and connected to the metal connection potion 121a through an opening 119c formed in the second insulating film 119.

In the liquid crystal display device constituted in the above described way, the gate bus lines 111 are provided with scanning signals which cause the TFT 117 to be performed in on/off operation, and the data bus lines 115 are provided with display signals.

When a voltage is not applied on the layer of liquid crystals 140, liquid crystal molecules are aligned almost perpendicular to the substrate surfaces. However, liquid crystal molecules in the vicinities of the protrusions 135 are aligned in directions perpendicular to the inclined surfaces of the protrusions 135. In this state, since light emitted from the backlight is blocked by two polarizing plates, a black display is presented.

When the scanning signals provided to the gate bus lines 111 cause the TFT 117 to be turned on, the sub picture element electrodes 120a to 120c are provided with the display signals, and liquid crystal molecules are inclined at angles in accordance with the voltages of the display signals. In this case, directions in which the liquid crystal molecules fall are determined by the protrusions 135 for alignment control and the lines of electric forces generated in oblique directions from edges of the sub picture element electrodes 120a to 120c to the outside; and the liquid crystal molecules are aligned in radial direction with respect to the protrusions 135 as centers. In this state, of the light emitted from the backlight, certain amount of light in accordance with inclined angles of the liquid crystal molecules is transmitted through the two polarizing plates, and emitted to the front side (observer side) of the liquid crystal panel 100.

Referring to FIGS. 3 to 5, hereinafter, a method of manufacturing the liquid crystal display device of the present embodiment will be described. First, a method of manufacturing the TFT 110 will be described.

First, a first metal film having a laminated structure of, for example, Al (aluminum)-Ti (titanium) is formed by sputtering on a glass substrate 110a which becomes a base for the TFT substrate 110. This first metal film is patterned by photolithography, and thus the gate bus lines 111 and the auxiliary capacitance bus line 112 are formed.

Next, a first insulating film 113 (gate insulating film) made of $SiO_2$ with thickness of 0.3 μm is formed by chemical vapor deposition (CVD) on the entire upper face of the glass substrate 110a. Subsequently, a semiconductor film (an amorphous silicon film or a polysilicon film) 114a, which becomes an active layer for the TFT 117, is formed on a predetermined region of the first insulating film 113. Thereafter, a film, e.g. a SiN film, is formed on the entire upper face of the glass substrate 110a, and this SiN film is patterned whereby a channel protection film 114b is formed on an area which becomes a channel of the semiconductor film 114a.

Next, a second metal film having a laminated structure of, for example, Ti—Al—Ti is formed on the entire upper face of the glass substrate 110a, and patterned by photolithography, thus forming the data bus lines 115, the drain electrode 117a, the source electrode 117b, the wiring 117c connected to the source electrode 117b, the auxiliary capacitance electrode 118a, and the metal connection portion 121a. The width of the metal connection portion 121a is set to, for example, 5 μm. In addition, it is preferable that the length of the metal connection portion 121a is slightly greater than the intervals between the sub picture element electrodes 120a, 120b, and 120c.

Next, the second insulating film 119 made of, for example, $SiO_2$ with thickness of 0.3 μm is formed on the entire upper face of the glass substrate 110a. Then, the contact hole 119a communicating with the wiring 117c, the contact hole 119b communicating with the auxiliary capacitance electrode 118a, and the opening 119c communicating with the metal connection portion 121a are formed on the second insulating film 119 by photolithography. In this case, it is preferable that the opening 119c is slightly narrower than the metal connection portion 121a.

Subsequently, an ITO film is formed on the entire upper face of the glass substrate 110a by sputtering. This ITO film is patterned by photolithography, and the transparent electrodes 120a, 120b, and 120c, and the ITO connection portions 121b are formed, the ITO connection portions 121b formed to make connections between the transparent electrodes 120a, 120b, and 120c. These transparent electrodes 120a to 120c are of almost quadrate with approximately 80 μm on a side, as mentioned above, and the intervals (the widths of the slits 122) between the transparent electrodes 120a, 120b, and 120c is set to be, for example, 8 μm. The width of the ITO connection portion 121b is set to, for example, 5 μm.

The transparent electrode 120a is electrically connected to the wiring 118a through the contact hole 119a, and the transparent electrode 120b is electrically connected to the auxiliary capacitance electrode 118 through the contact hole 119b. The ITO connection portion 121b is electrically connected to the metal connection portion 121 through the opening 119c.

Next, a substance, e.g. polyimide, is applied on the entire upper face of the glass substrate 110a, and vertical alignment films (not shown) are formed to cover the surfaces of the transparent electrodes 120a to 120c. Thus, the TFT substrate 110 is completed.

Next, a method of manufacturing the opposite substrate 130 will be described. First, the black matrix 131 is formed using metal such as Cr (chromium), or black resin on (under in FIG. 4) the glass substrate 130a which becomes a base for the opposite substrate 130. This black matrix 131 is formed at a position where the black matrix 131 faces the gate bus lines 111, the data bus lines 115, and the TFT 117 on the TFT substrate 110, and is formed so that the black matrix 131 is slightly wider than the gate bus lines 111 and the data bus lines 115.

Red photosensitive resin, green photosensitive resin, and blue photosensitive resin are used to form the color filters 132 on the glass substrate 130a. A color filter 132 of any one color among red, green, and blue is placed in each picture element. In the present embodiment, one pixel is constituted by the three picture elements, i.e. a red picture element, a green picture element, and a blue picture element, which are adjoining in the horizontal direction, hence enabling to display various colors.

Subsequently, the common electrode 133 made of ITO is formed on the color filter 132 by sputtering. Then, photoresist is applied over the common electrode 133, and a photoresist film is formed. This photoresist film is exposed through a predetermined exposure mask, and thereafter a developing process is performed to form the protrusions 135 for alignment control almost in cone. These protrusions 135 are formed at positions where the protrusions 135 respectively face to the centers of the transparent electrodes 120a to 120c. The diameters of the bottoms of these protrusions 135 are set to, for example, approximately 10 μm, and the heights thereof are set to, for example, 2.5 μm.

Next, a substance, e.g. polyimide, is applied over the entire upper face of the glass substrate 130a, and thereby a vertical alignment film (not shown) is formed to cover the surfaces of the common electrode 133 and the protrusions 135. Thus, the opposite substrate 130 is completed.

The TFT substrate 110 and the opposite substrate 130 manufactured in the above described manner are placed to face each other with spacers (not shown) interposed therebetween; and liquid crystals with negative dielectric anisotropy are sealed between the TFT substrate 110 and the opposite substrate 130, hence constituting the liquid crystal panel 100. Polarizing plates are attached respectively to the front and back of the liquid crystal panel 100, and, further, to the back thereof a backlight is fixed. Thus, the liquid crystal display device of the present embodiment is completed.

In the liquid crystal display device of the present embodiment, since electrical connections between the sub picture element electrodes 120a, 120b, and 120c are established by using the connection wirings 121 which have double-layered structures of the metal connection portions 121a and the ITO connection portions 121b, the establishing of the electrical connections between the sub picture element electrodes 120a to 120c can be secured when a break occurs even in the process of forming the ITO connection portion 121b. Thus, the occurrence of failure is prevented, hence achieving the effect of improving yield for the liquid crystal display device.

The metal connection portion 121a is formed simultaneously with the data bus lines 115, the drain electrode 117a, the source electrode 117b, the auxiliary capacitance electrode 118a, and the like; and the ITO connection portion 121b is formed simultaneously with the sub picture element electrodes 120a to 120c, hence achieving the effect of avoiding an increase in manufacturing steps.

In the above embodiment, a case has been described in which the metal connection portion 121a is formed simultaneously with the data bus lines 115 and the like by patterning the second metal film. However, it is to be understood that the present invention is not intended to be limited to the case described above, for example, the metal connection portion 121a may be formed simultaneously with the gate bus lines 111 and the like by patterning the first metal film.

Figure 6:
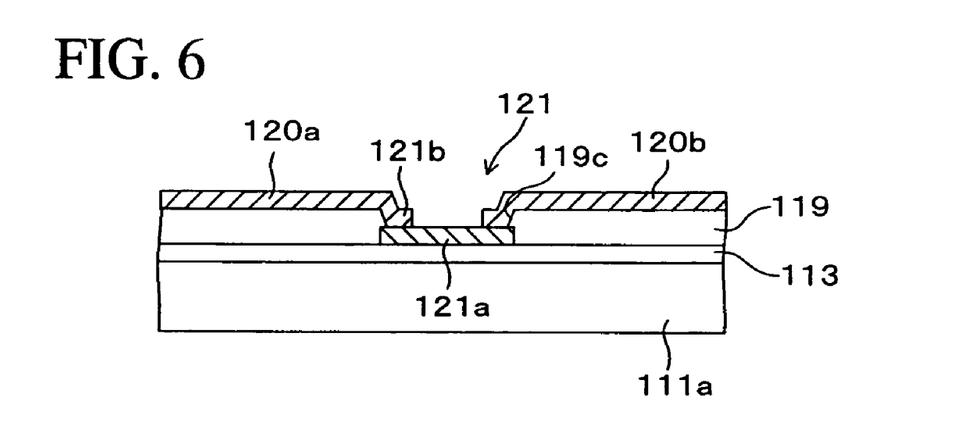
FIG. 6 is a sectional view for a modified example of the connection wiring.

Moreover, in the present embodiment, although the ITO connection portion 121b is directed to cover the entire surface of the metal connection portion 121a which is exposed into the opening 119c, the ITO connection portion 121b may not necessarily cover the entire surface of the metal connection portion 121a which is exposed into the opening 119c, as shown in FIG. 6.

Second Embodiment

Figure 7:
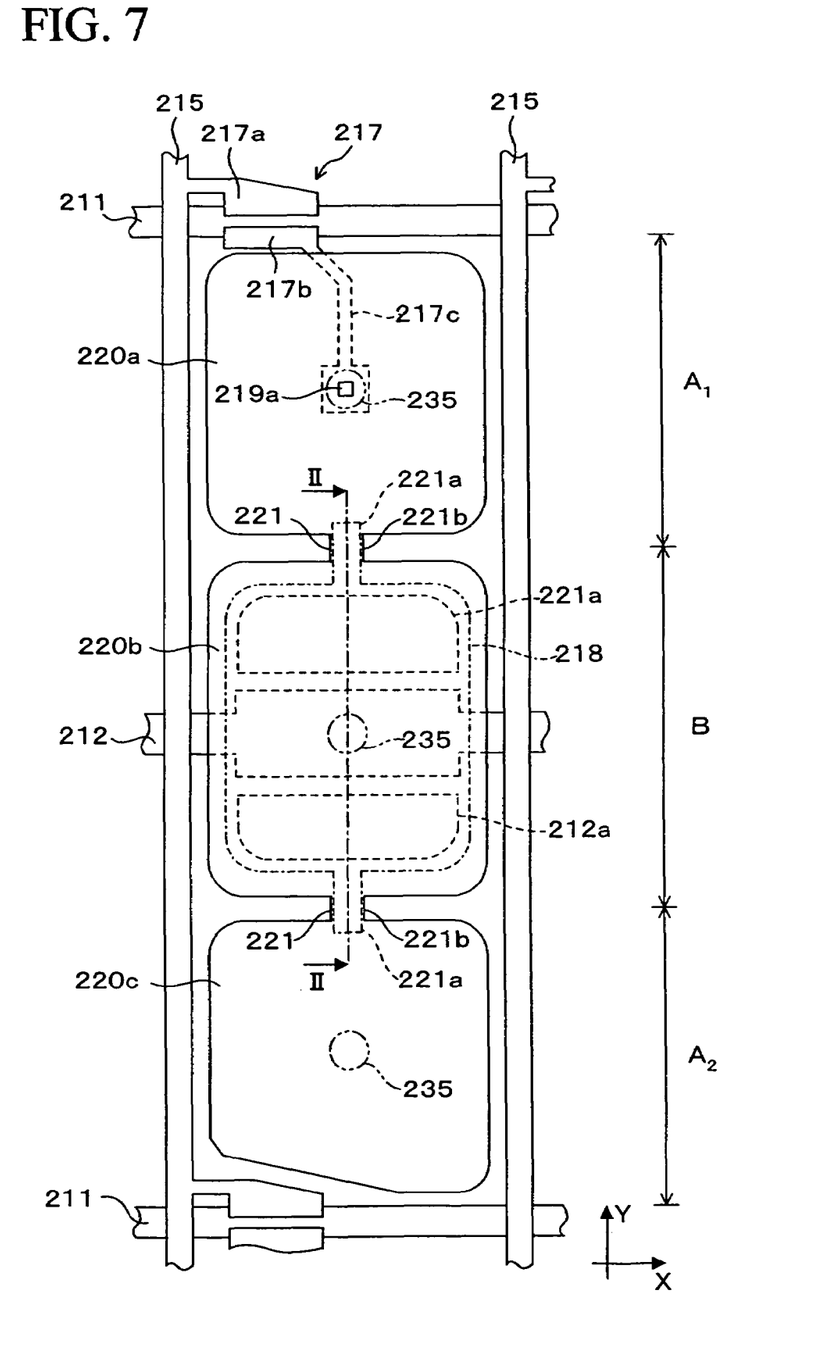
FIG. 7 is a plan view showing a liquid crystal display device of a second embodiment of the present invention.
Figure 8:
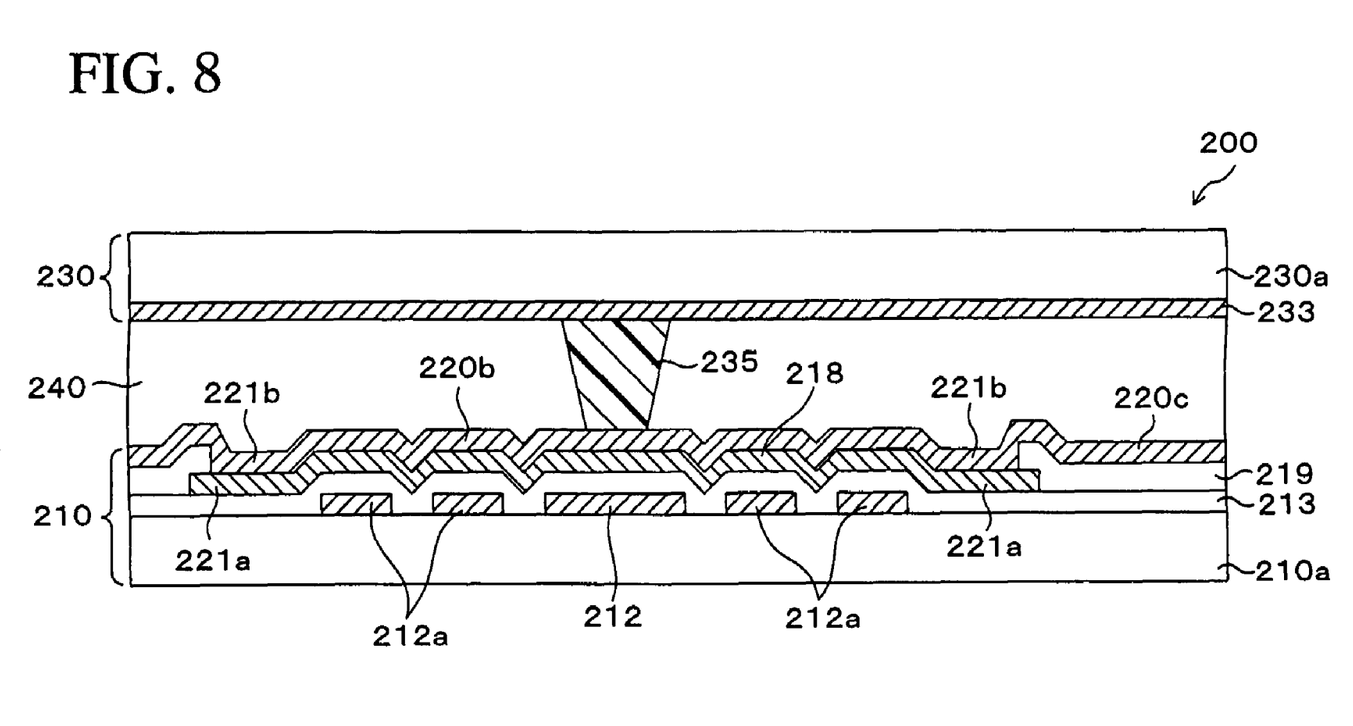
FIG. 8 is a sectional view taken along the line II-II in FIG. 7.

Hereinafter, a second embodiment will be described in which the present invention is applied to a transflective liquid crystal display device. FIG. 7 is a plan view showing a liquid crystal display device of the second embodiment of the present invention, and FIG. 8 is a sectional view taken along the line II-II in FIG. 7. However, in FIG. 8, drawings for a black matrix and a color filter on an opposite substrate are omitted.

As shown in FIG. 8, a liquid crystal panel 200 includes a TFT substrate 210, a opposite substrate 230, and a layer of liquid crystals 240 in which liquid crystals with negative dielectric anisotropy are sealed between the TFT substrate 210 and the opposite substrate 230. On the front side (observer side; upper side in FIG. 8) and the back side (lower side in FIG. 8) of the liquid crystal panel 200, λ/4 plates (not shown) and polarizing plates (not shown) are placed, respectively, further, a backlight (not shown) is disposed on the backside of the liquid crystal panel 200.

As in the first embodiment, on the TFT substrate 210, a plurality of gate bus lines 211 extending in the horizontal direction (in the direction of X-axis), and a plurality of data bus liens 215 extending in the vertical direction (in the direction of Y-axis) are formed. Picture element regions are, respectively, sectioned by these gate bus lines 211 and data bus lines 215. Moreover, an auxiliary capacitance bus line 212 is formed on the TFT substrate 210, which intersects respective picture element regions.

A TFT 217 is formed in each picture element region. For the TFT 217, part of the gate bus lines 211 serves as a gate electrode; and a drain electrode 217a and a source electrode 217b are placed to face each other with the gate bus lines 211 interposed therebetween.

One picture element region is divided into transmission regions A1, A2, and a reflection region B. On the transmission regions A1, A2, transparent electrodes (sub picture element electrodes) 220a and 220c made of ITO are formed; and, on the reflection region B, a reflection electrode (reflection film) 218 made of metal such as aluminum (Al) and a transparent electrode (sub picture element electrode) 220b covering the reflection electrode 218 are formed. The transparent electrodes 220a to 220c are electrically connected to each other with connection wirings 221. Each of the connection wirings 221 has a laminated structure of a metal connection portion 221a formed integral with the reflection electrode 218 and a ITO connection portion 221b formed integral with the transparent electrodes 220a to 220c.

A metal film 212a is formed under the reflection electrode 218 and on both sides of the auxiliary capacitance bus line 212. On this metal film 212a, a number of fine openings are provided to form irregularities on the surface of the reflection electrode 218.

Furthermore, in the liquid crystal display device of the present embodiment, unlike the first embodiment, an auxiliary capacitance electrode is not provided. However, the reflection electrode 218, and the auxiliary capacitance bus line 212, and a first insulating film 213 interposed therebetween constitute an auxiliary capacitance.

Moreover, in the present embodiment, protrusions 235 for alignment control on the opposite substrate 230 are formed at levels where the protrusions 235 contact with the TFT substrate 210, and the protrusions 235 for alignment control serve as spacers in determining the thickness (cell gap) of the layer of liquid crystals 240.

Hereinafter, a method of manufacturing the liquid crystal display device of the present embodiment will be described. First, a method of manufacturing the TFT substrate 210 will be described.

A first metal film having a laminated structure of, for example, Al (aluminum)-Ti (titanium) is formed by sputtering on a glass substrate 210a which becomes a base for the TFT substrate 210. This first metal film is patterned by photolithography; and thus the gate bus lines 211, the auxiliary capacitance bus line 212, and the metal film 212a are formed. At this time, a number of fine openings are formed in the metal film 212a.

Next, a substance, e.g. $SiO_2$, is deposited on the entire upper face of the glass substrate 210a, and a first insulating film 213 (gate insulating film) is formed. Subsequently, a semiconductor film, which becomes an active layer for the TFT 217, is formed on a predetermined region of the first insulating film 213, and further a channel protection film made of SiN is formed on the semiconductor film.

Subsequently, a second metal film having a laminated structure of, for example, Ti—Al—Ti is formed on the entire upper face of the glass substrate 210a, and patterned by photolithography, thus forming the data bus lines 215, the drain electrode 217a, the source electrode 217b, the wiring 217c connected to the source electrode 217b, the reflection electrode 218, and the metal connection portion 221a connected to the reflection electrode 218. At this time, irregularities are formed on the surface of the reflection electrode 218 due to the presence of an opening of the metal film 212a which is placed under the reflection electrode 218.

A second insulating film 219 is formed on the entire face of the glass substrate 210a by depositing a substance, e.g. $SiO_2$, thereon. Then, a contact hole 219a communicating with a wiring 218c, and an opening into which the metal connection portion 221a and the reflection electrode 218 are exposed are formed in the second insulating film 219 by photolithography. In this case, the edges of the metal connection portion 221a and the reflection electrode 218 are left covered with the second insulating film 219.

Next, an ITO film is formed on the entire upper face of the grass substrate 210a, and patterned by photolithography, thus forming the transparent electrodes 220a to 220c, and the ITO connection portion 221b. The transparent electrode 220a is electrically connected to the wiring 217c which is connected to the source electrode 217b, through the contact hole 219a. The transparent electrode 220b is electrically connected to the reflection electrode 218, and the ITO connection portion 221b is connected to the metal connection portion 221a.

Then, a substance, e.g. polyimide, is applied over the entire upper face of the glass substrate 210a, and a vertical alignment film (not shown) covering the surfaces of the transparent electrodes 220a to 220c is formed. Thus, the TFT substrate 210 is completed.

Next, a method of manufacturing the opposite substrate 230 will be described. First, as in the first embodiment, a black matrix and a color filter are formed on the glass substrate 230a which becomes a base for the opposite substrate 230. Thereafter, a common electrode 233 made of ITO is formed on the color filter by sputtering.

Then, photoresist is applied over the common electrode 233 to form a photoresist film of thickness, for example, 3-4 μm. The photoresist film thus formed is exposed through a predetermined exposure mask, and thereafter a developing process is performed to form the protrusions 235 for alignment control. Next, polyimide is applied over the entire upper face of the glass substrate 230a, and thereby a vertical alignment film (not shown) is formed to cover the surfaces of the common electrode 233 and the protrusions 235. Thus, the opposite substrate 230 is completed.

The TFT substrate 210 and the opposite substrate 230 manufactured in the above described manner are placed to face each other, and liquid crystals with negative dielectric anisotropy are sealed therebetween, hence constituting the liquid crystal panel 200. The λ/4 plates and polarizing plates are joined respectively to the front and back of the liquid crystal panel 200, and, further, to the back side thereof a backlight is fixed. Thus, the liquid crystal display device of the present embodiment is completed.

In the present embodiment as in the aforementioned first embodiment, since electrical connections between the transparent electrodes 220a, 220b, and 220c are established by using the connection wirings 221 which have a double-layered structure of the metal connection portion 221a and the ITO connection portion 221b, the establishing of the electrical connections are secured when a break occurs even in the process of forming the ITO connection portion 221b. Thus, the occurrence of failure is prevented, hence achieving the effect of improving yield for the liquid crystal display device.

The metal connection portion 221a is formed simultaneously with the reflection electrode 218, and the ITO connection portion 221b is formed simultaneously with the transparent electrodes 220a to 220c, hence achieving the effect of avoiding an increase in manufacturing steps.

In the foregoing first and second embodiments, a case has been described in which a picture element electrode is subdivided into a plurality of sub picture element electrodes each being almost rectangular. However, it is to be understood that the present invention is not intended to be limited to the case described above. For example, as shown in FIG. 2, the present invention is applicable to a liquid crystal display device in which the picture element electrode is subdivided into the plurality of sub picture element electrodes using the plurality of slits extending into oblique directions.

What is claimed is:

1. A liquid crystal display device which has a first substrate and a second substrate the first and second substrates being placed to face each other, and a layer of liquid crystals being formed by sealing liquid crystals between the first and second substrates; and in which a plurality of sub picture element electrodes made of a transparent conductive material is formed on the first substrate in each picture element region, comprising a connection wiring which has a metal connection portion made of a metal film, and a transparent conductive connection portion made of a transparent conductive material the transparent conductive connection portion being formed on the metal connection portion; and with which the plurality of sub picture element electrodes in one picture element region are electrically connected to each other, wherein one picture element region is a region sectioned by two adjacent gate bus lines and two adjacent data bus lines.

2. The liquid crystal display device according to claim 1, comprising a thin-film transistor which is formed on the first substrate and which transmits display signals to the plurality of sub picture element electrodes; and wherein the metal connection portion of the connection wiring is formed on a layer same as that for a source/drain electrode, or a gate electrode of the thin-film transistor.

3. The liquid crystal display device according to claim 1, wherein the transparent conductive connection portion of the connection wiring is formed integral with the sub picture element electrodes.

4. The liquid crystal display device according to claim 1, wherein a reflection film made of metal is formed on the first substrate.

5. The liquid crystal display device according to claim 4, wherein the metal connection portion of the connection wiring is formed integral with the reflection film.

6. The liquid crystal display device according to claim 4, wherein a surface of the reflection film is covered with one of the plurality of sub picture element electrodes.

7. The liquid crystal display device according to claim 1, wherein the metal connection portion and the transparent conductive connection portion are connected through an opening formed in an interlayer insulation film.

8. The liquid crystal display device according to claim 7, wherein the transparent conductive connection portion covers an entire upper face of the metal connection portion which is exposed into the opening.

9. The liquid crystal display device according to claim 7, wherein the transparent conductive connection portion covers part of the metal connection portion which is exposed into the opening.

10. A method of manufacturing a liquid crystal display device, comprising the steps of:
    forming a first metal film on a first substrate;
    forming a gate bus line by patterning the first metal film;
    forming a first insulating film on the entire upper face of the first substrate;
    forming a semiconductor film, which becomes an active layer for a thin-film transistor, on a predetermined region of the first insulating film;
    forming a second metal film on the entire upper face of the first substrate;
    forming a data bus line, a source electrode and a drain electrode constituting the thin-film transistor, and a metal connection portion by patterning the second metal film;
    forming a second insulating film on the entire upper face of the first substrate;
    forming in the second insulating film an opening into which the metal connection portion is exposed;
    forming a transparent conductive film on the entire upper face of the first substrate;
    forming a plurality of sub picture element electrodes in an each picture element region and forming a transparent conductive connection portion which is connected to the metal connection portion being exposed into the opening and with which the plurality of sub picture element electrodes are electrically connected by patterning the transparent conductive film; and
    placing a second substrate to face the first substrate, and sealing liquid crystals therebetween, wherein one picture element region is a region sectioned by two adjacent gate bus lines and two adjacent data bus lines.

* * * * *